(12) United States Patent
Takahashi (10) Patent No.: US 8,054,475 B2
(45) Date of Patent: Nov. 8, 2011

(54) IMAGE FORMING SYSTEM AND PRINTING-MEDIUM FEEDING DEVICE

(75) Inventor: Atsuya Takahashi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 1101 days.

(21) Appl. No.: 11/834,236

(22) Filed: Aug. 6, 2007

(65) Prior Publication Data

US 2008/0055635 A1    Mar. 6, 2008

(30) Foreign Application Priority Data

Aug. 31, 2006   (JP) ................. 2006-236758

(51) Int. Cl.
*G06F 15/00* (2006.01)
*B65H 1/08* (2006.01)
(52) U.S. Cl. ...................... 358/1.12; 271/126
(58) Field of Classification Search ............... 358/1.12, 358/1.11, 1.18, 1.14, 1.13, 1.5, 1.111; 271/145, 271/240, 253, 298, 126, 176, 3.14, 162; 400/634, 400/55, 58, 617; 399/38, 16, 388, 23, 25
See application file for complete search history.

(56) References Cited

U.S. PATENT DOCUMENTS

| 5,619,307 A | 4/1997 | Machino et al. .......... 399/11 |
| 6,785,478 B2 * | 8/2004 | Takahashi et al. ........ 399/16 |
| 2004/0253010 A1 * | 12/2004 | Takahashi .................. 399/16 |

FOREIGN PATENT DOCUMENTS

| JP | 04-199159 A | 7/1992 |
| JP | 08-008935 A | 1/1996 |

* cited by examiner

*Primary Examiner* — Saeid Ebrahimi Dehkordy
(74) *Attorney, Agent, or Firm* — Fitzpatrick, Cella, Harper & Scinto

(57) ABSTRACT

Provided is an image forming system that suppresses an increase in number of signal lines between an image forming apparatus and optional units, curtails communication time period and alleviates communication load. To accomplish this, an image forming system includes an image forming apparatus and one or more optional units removably attached to the image forming apparatus. The image forming apparatus transmits a specifying command and an instruction command to all of the optional units by outputting the commands on a single common signal line. Each optional unit outputs acknowledgement status on a single common signal line in a case where an identifier appended to the instruction command is the same as an acquired identifier. If the identifiers are different, on the other hand, each optional unit outputs a value indicating whether it itself is currently performing an operation in response to acknowledgement status transmitted by another optional unit.

11 Claims, 9 Drawing Sheets

IMAGE FORMING SYSTEM AND PRINTING-MEDIUM FEEDING DEVICE

BACKGROUND OF THE INVENTION

1. Field of the Invention

The present invention relates to an image forming system in which an image forming apparatus and optional printing-medium feeding device communicate with each other, and to the printing-medium feeding device.

2. Description of the Related Art

Optional units such as a printing-medium feeding device are connected to an image forming apparatus in order to extend various capabilities of the apparatus. Such an optional unit and the image forming apparatus are connected by a signal line for transmitting information. For example, if a plurality of optional units have been connected, it is necessary that the state of each optional unit be checked in order to feed or transport a printing medium. Whether or not a printing-medium feeding device contains a printing medium and whether or not a cassette has been loaded in the printing-medium feeding device are examples of detectable states of a printing-medium feeding device serving as an optional unit. It is required that a plurality of such states be checked. In a case where a plurality of optional units have been connected, therefore, it is required that the image forming apparatus send and receive information to and from each of the optional units efficiently.

As for a communication interface between an image forming apparatus and optional units, the specification of Japanese Patent Application Laid-Open No. 08-008935 discloses an image forming apparatus to which a plurality of optional units are connected successively by a bus. The image forming apparatus described in Japanese Patent Application Laid-Open No. 08-008935 is so adapted that prescribed processing is communicated to the plurality of optional units simultaneously and the optional units operate in conformity with the processing content. Further, the specification of Japanese Patent Application Laid-Open No. 04-199159 discloses an image forming apparatus provided with means for notifying a host apparatus of a change in the internal status of a lower-order device.

Although the number of times communication relating to an instruction from the main body of the image forming apparatus can be reduced with the image forming apparatus described in the specification of Japanese Patent Application Laid-Open No. 08-008935, it is required that response signals from the additional optional units be received individually. Consequently, in a case where the image forming apparatus monitors the state of paper transport in the overall system, it is necessary that communication be performed a number of times equivalent to the number of optional units that have been added on. The problem that results is an increase in communication time period and communication load.

In a case where the image forming apparatus described in the specification of Japanese Patent Application Laid-Open No. 04-199159 notifies a connected optional unit of internal information of the apparatus, a separate notifying signal line is required. Further, it is required that a signal transmitted from the image forming apparatus to the optional unit be transmitted separately. The problem that results is an increase in communication time period and communication load.

A specific example of a problem is that it is not possible to shorten the intervals at which paper feed is executed in a paper feeding device mounted as an optional unit. Normally, when printing paper that has been loaded inside a paper feeding device is fed, it is necessary to suppress the occurrence of jamming and unwanted wear of the feed rollers. Accordingly, the image forming apparatus instructs a certain paper feeding device to feed printing paper, thereby causing the device to execute the paper-feed operation. After positively sensing whether printing paper is still loaded in the printing device following the completion of the paper-feed operation, the image forming apparatus issues the next paper-feed instruction. In a case where time for communication between the image forming apparatus and a plurality of printing devices is great or in case of a large communication load, it becomes necessary to lengthen the paper-feed interval in order that this processing may be executed (this interval is referred to as the "time between sheets" below). If the time between sheets is lengthened, the throughput of the image forming operation (the number of printed sheets per unit time) declines.

SUMMARY OF THE INVENTION

The present invention enables the realization of an image forming system that suppresses an increase in number of signal lines between an image forming apparatus and optional units, curtails communication time period and alleviates communication load.

According to one aspect of the present invention, an image forming system comprises:

an image forming apparatus adapted to form an image on a printing medium;

a plurality of printing-medium feeding devices removably attached to the image forming apparatus;

a common first signal line connecting the image forming apparatus and each of the plurality of printing-medium feeding devices, the first signal line being adapted to transmit a command from the image forming apparatus to each of the plurality of printing-medium feeding devices; and a common second signal line connecting the image forming apparatus and each of the plurality of printing-medium feeding devices, the second signal line being adapted to transmit status information of the printing-medium feeding devices from the plurality of printing-medium feeding devices to the image forming apparatus in response to the command;

wherein the image forming apparatus has a transmitting unit adapted to specify one of the plurality of printing-medium feeding devices and transmit the command via the first signal line; and the specified printing-medium feeding device has a transmitting unit adapted to transmit first information via the second signal line in response to the command transmitted by the transmitting unit of the image forming apparatus, and an unspecified printing-medium feeding device has a control unit adapted to concatenate second information with the first information.

According to another aspect of the present invention, a printing-medium feeding device connected to an image forming apparatus, the device comprises:

a receiving unit adapted to receive a command that is output from the image forming apparatus; and a transmitting unit adapted to transmit first information of the printing-medium feeding device to the image forming apparatus in response to the command;

wherein in a case where another printing-medium feeding device connected to the image forming apparatus transmits the first information to the image forming apparatus, second information different from the first information is concatenated with the information.

According to still another aspect of the present invention, an image forming system comprises:

an image forming apparatus adapted to form an image on a printing medium; and a plurality of printing-medium feeding devices removably attached to the image forming apparatus; wherein the image forming apparatus includes a controller for specifying one of the printing-medium feeding devices, wherein first status information of the printing-medium feeding device specified with the image forming apparatus and second status information the printing-medium feeding device not specified with the image forming apparatus are transmitted to the image forming apparatus together.

Further features of the present invention will become apparent from the following description of exemplary embodiments with reference to the attached drawings.

DESCRIPTION OF THE EMBODIMENTS

Preferred embodiments of the present invention will now be described with reference to the drawings. It should be noted that the relative arrangement of the components, the numerical expressions and numerical values set forth in these embodiments do not limit the scope of the present invention unless it is specifically stated otherwise.

First Embodiment

Figure 1:
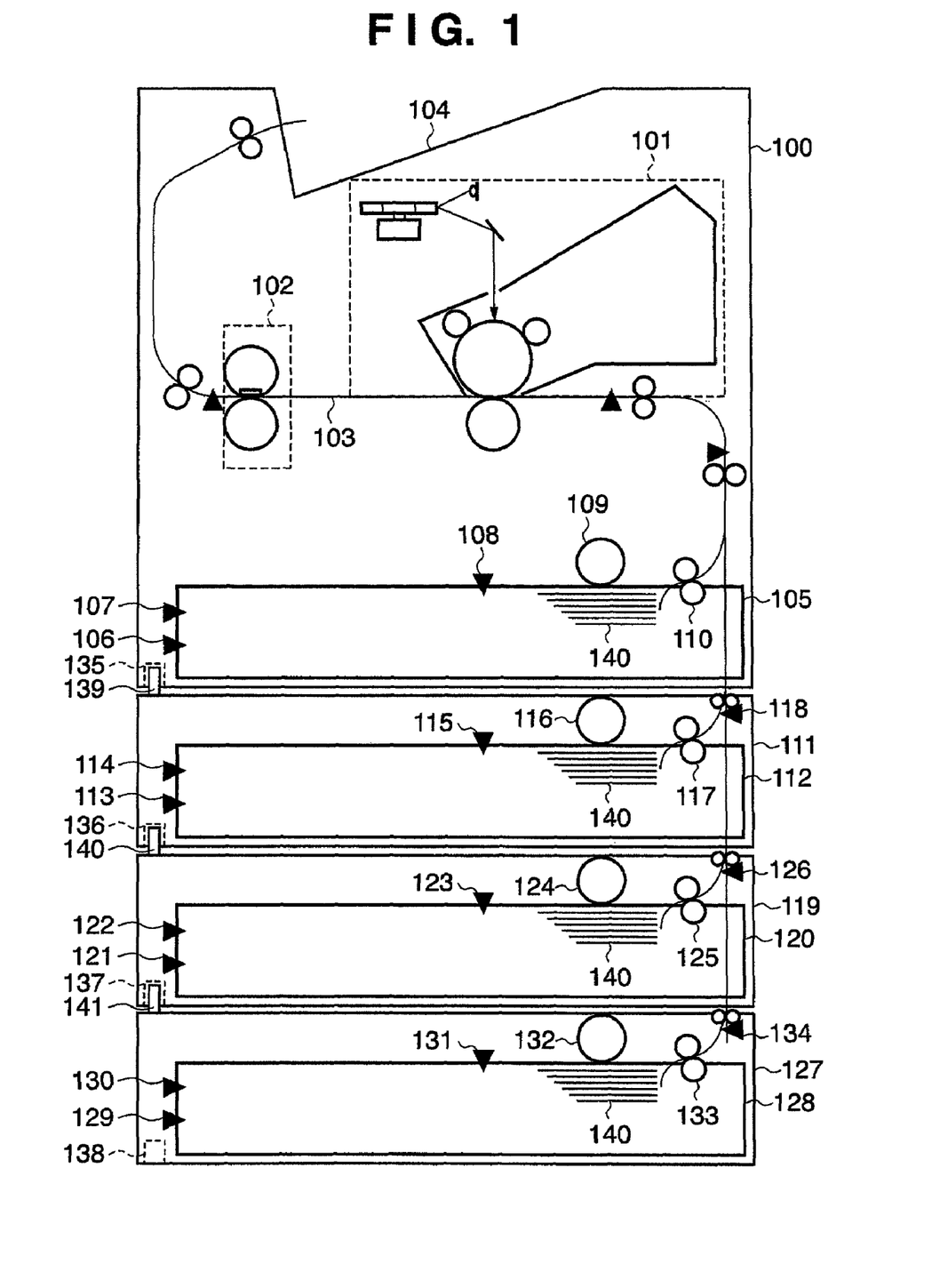
FIG. 1 is a schematic view illustrating the configuration of an image forming apparatus corresponding to a first embodiment of the present invention.

A first embodiment of the present invention will be described with reference to FIGS. 1 to 7. FIG. 1 is a schematic view illustrating the configuration of an image forming apparatus 100 corresponding to a first embodiment of the present invention.

The image reader 101 includes an image forming unit 101, a fixing unit 102, a transport path 103, a paper-drop tray 104 and a printing-medium cassette 105. Printing-medium feeding devices 111, 119, 127 are removably loaded in the image forming apparatus 100. A printing-medium feeding device will be described as an example of an optional unit in this embodiment.

The image forming unit 101 has a photosensitive drum serving as a carrier for carrying an electrostatic latent image, and a developing unit for developing an electrostatic latent image that has been formed on the drum. By virtue of this arrangement, the image forming unit 101 forms an image on a printing medium 140 transported on transport path 103 from the printing-medium cassette 105 or from the printing-medium feeding devices 111, 119, 127. A plurality of sensors for sensing that the printing medium 140 has been transported are placed on the transport path 103.

When an image is formed by the image forming unit 101, the printing medium 140 is transported to the fixing unit 102. The as yet unfixed developed image formed on the printing medium 140 is fixed to the printing medium 140 by the fixing unit 102. A printing-medium discharge roller is placed downstream of the fixing unit 102. The printing-medium discharge roller discharges the printing medium 140 into the paper-drop tray 104.

A size sensor 106, cassette-loaded sensor 107 and printing-medium-loaded sensor 108 are disposed at the printing-medium cassette 105 in which the printing medium is loaded. A pick-up roller 109 and a roller pair 110 are disposed in the vicinity of the printing-medium cassette 105. The size sensor 106 detects the size of the printing medium contained in the printing-medium cassette 105. The cassette-loaded sensor 107 checks to determine whether the image forming apparatus 100 contains the printing-medium cassette 105. The printing-medium-loaded sensor 108 detects whether the printing medium 140 has been loaded in the printing-medium cassette 105. A single revolution of the pick-up roller 109 feeds the printing medium 140 from the printing-medium cassette 105 and sends it to the transport path 103. The roller pair 110 separates one sheet from the printing medium 140, which has been picked up by the pick-up roller 109, and sends the sheet to the transport path 103.

The printing-medium feeding devices 111, 119, 127 are optional units removably connected to the image forming apparatus 100. The printing-medium feeding devices 111, 119, 127 have printing-medium cassettes 112, 120, 128, respectively, and size sensors 113, 121, 129, respectively, for sensing the sizes of the printing media in the printing-medium cassettes. Further provided are cassette-loaded sensors 114, 122, 130 for sensing whether the respective printing-medium cassettes 112, 120, 128 have been loaded, and printing-medium-loaded sensors 115, 123, 131 for sensing whether the printing medium is present or not. Pick-up rollers 116, 124, 132 and roller pairs 117, 125, 133 are placed in the vicinity of the printing-medium cassettes 112, 120, 128, respectively. These structural elements perform a feeding operation similar to that for feeding the printing medium from the printing-medium cassette 105 of the image forming apparatus 100. Transport sensors 118, 126, 134 are placed in the vicinity of printing-medium cassettes 112, 120, 128, respectively. The transport sensors 118, 126, 134 sense the leading edge of the printing medium 140 in order to detect whether the printing medium 140 has been fed reliably by the feeding operation of the pick-up rollers 116, 124, 132.

Thus, as described above, each printing-medium feeding device has a printing-medium cassette, a size sensor, a cassette-loaded sensor, a printing-medium-loaded sensor a pick-up roller, a roller pair and a transport sensor. Further, each printing-medium feeding device has a mechanism for loading it in the image forming apparatus. The image forming apparatus is also provided with a mechanism connecting the printing-medium feeding devices. Specifically, a pin-shaped projection (139, 140, 141), for example, is provided on the side of the printing-medium feeding device. The device is connected by inserting the projection into a recess (135) on the side of the image forming apparatus. The printing-medium feeding devices are provided with recesses (136, 137, 138) that are used when printing-medium feeding devices are connected to each other. Although only one projection and one recess are illustrated in FIG. 1, two or more are provided and connected to achieve positioning. Further, the image forming apparatus and each printing-medium feeding device are provided with connectors (not shown) that connect signal lines for communication between the image forming apparatus and printing-medium feeding devices, described below.

Figure 2:
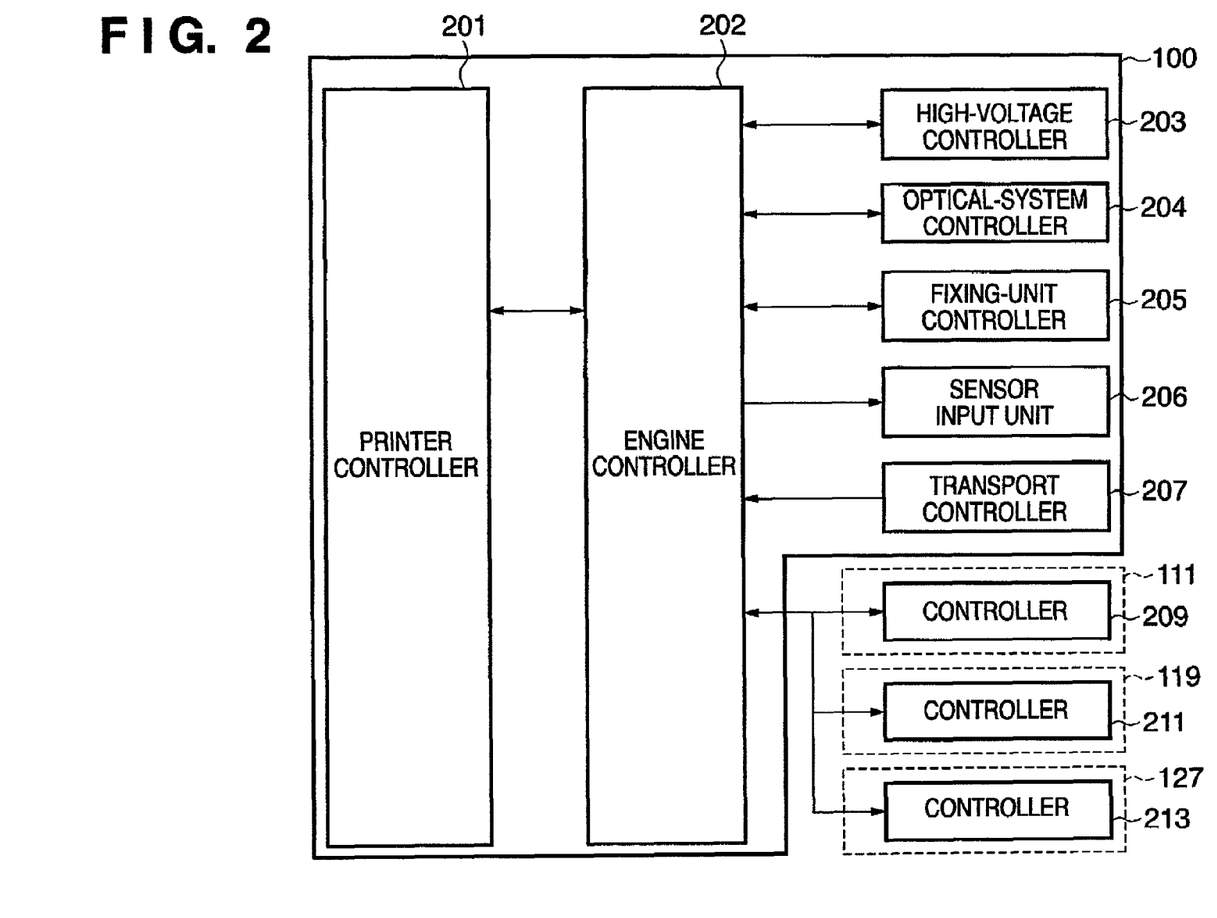
FIG. 2 is a diagram illustrating the circuit configuration of a control system for controlling mechanisms corresponding to the first embodiment.

FIG. 2 is a diagram illustrating the circuit configuration of a control system for controlling mechanisms corresponding to the first embodiment. Control blocks for controlling the mechanisms of the image forming apparatus 100 set forth in FIG. 1 will now be described.

The image forming apparatus 100 includes a printer controller 201 and an engine controller 202. The image forming apparatus 100 further includes a high-voltage controller 203, an optical-system controller 204 a fixing-unit controller 205, a sensor input unit 206 and a transport controller 207 that are connected directly to each of the mechanisms and connected to the engine controller 202.

The printer controller 201 expands image code data, which is sent from an external device such as a host computer, into bit data, reads information from within the image forming apparatus 100 and displays this information on an operation panel. Each mechanism has its operation controlled in accordance with commands from the printer controller 201 and communicates the internal information of each mechanism to the printer controller 201.

In accordance with a command from the engine controller 202, the high-voltage controller 203 controls high-voltage output at each step for performing image formation. In accordance with a command from the engine controller 202, the optical-system controller 204 exercises control so as to drive or halt an exposure unit. In accordance with a command from the engine controller 202, the fixing-unit controller 205 exercises control so as to supply or halt the feed of current to a fixing heater.

In accordance with a command from the engine controller 202, the sensor input unit 206 exercises control so as to drive or halt each sensor disposed within the image forming apparatus 100. In accordance with a command from the engine controller 202, the transport controller 207 drives or halts each roller disposed within the image forming apparatus 100, thereby controlling transport of the printing medium 140.

Controllers 209, 211, 213 of the printing-medium feeding devices 111, 119, 127, respectively, are connected to the engine controller 202 by signal lines. The controllers 209, 211, 213 are cascade-connected to the engine controller 202 by signal lines and are capable of performing serial communication. The details regarding communication between the controllers 209, 211, 213 of the printing-medium feeding devices and the engine controller 202 will be described later with reference to FIGS. 3A and 3B.

Figure 3A:
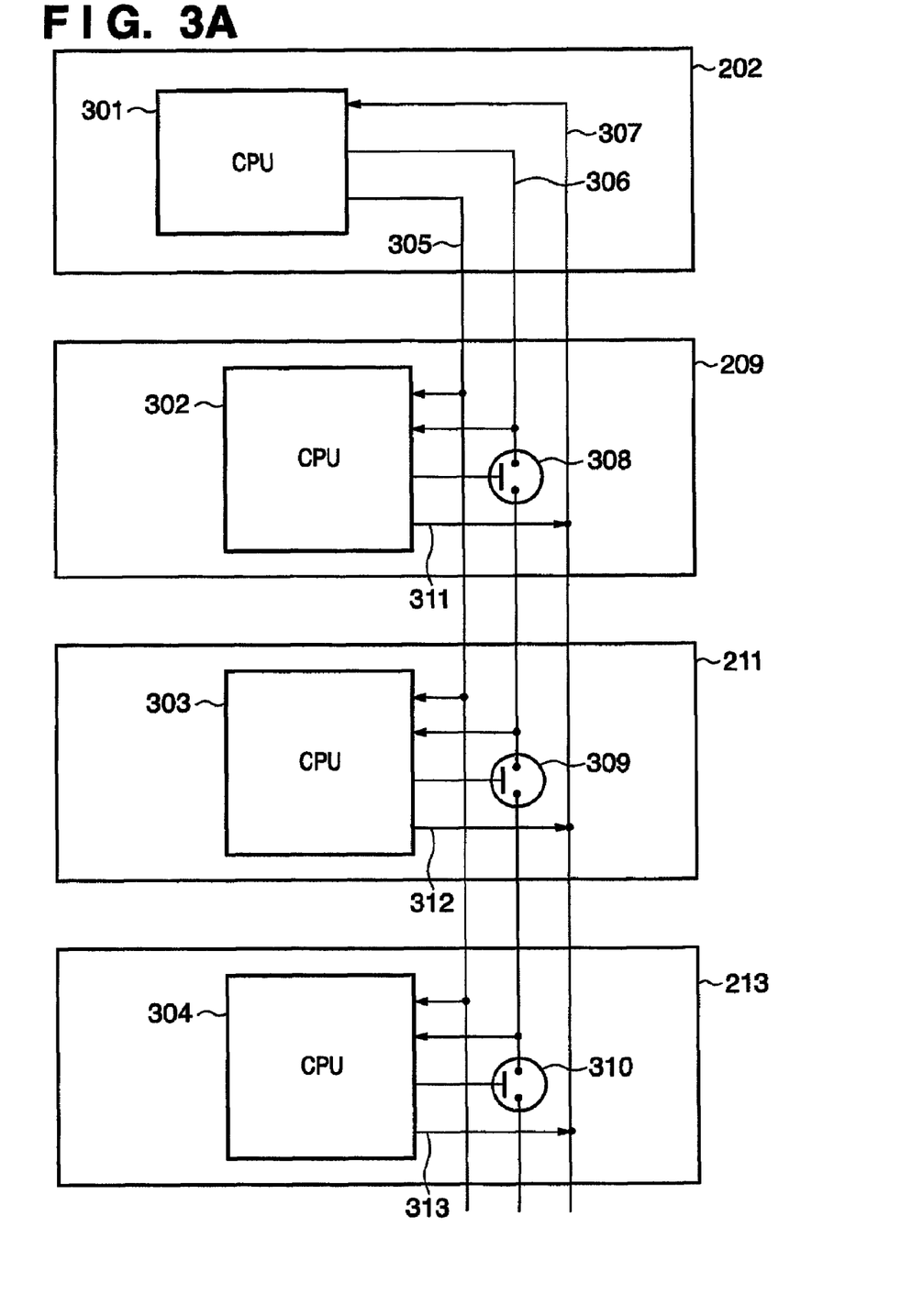
FIG. 3A is a diagram illustrating serial communication between an engine controller and a controller of each paper feeding device corresponding to the first embodiment.

FIG. 3A is a diagram illustrating serial communication between the engine controller 202 and the controllers of the printing-medium feeding devices 111, 119, 127 corresponding to the first embodiment. Serial communication between the image forming apparatus 100 and the printing-medium feeding devices 111, 119, 127 serving as the optional units and a method of assigning specific information to each printing-medium feeding device will be described.

The engine controller 202 includes a CPU 301 for controlling the engine controller 202. Similarly, the controllers 209, 211, 213 of the respective printing-medium feeding devices includes CPUs 302, 303, 304, respectively, for controlling the respective controllers. The CPU 301 and the CPUs 302, 303, 304 are cascade-connected by a CLK (clock) signal line 305, CMD (command) signal line 306 and STS (status) signal line 307. These signal lines are common signal lines whereby the units communicate with one another.

The CLK signal line 305 is a common signal line that transmits a synchronizing signal (referred to as a "CLK signal"), which is output from the CPU 301, to the CPUs 302, 303, 304. The CMD signal line 306 is a common signal line that transmits a command signal (referred to as a "CMD signal" line), which is sent from the CPU 301 to the CPUs 302, 303, 304. The STS signal line 307 is a common signal line that transmits an acknowledgement signal (referred to as an "STS signal" below), which is in response to a command signal, sent from the CPUs 302, 303, 304 to the CPU 301. The CLK signal is a signal for synchronizing the CPUs (301, 302, 303, 304) in order that the CMD signal and STS signal may be sent and received. The CMD signal is a signal for instructing the CPUs of the printing-medium feeding devices to operate and for confirming status. The STS signal is acknowledgement to the CMD signal and transmits the status of each printing-medium feeding device and warning of an abnormality, etc. Warning of an abnormality means notifying the CPU 301 of the fact that an error has occurred in serial communication. Further, the STS signal that is input to the CPU 301 has a common data section that is output from the CPUs 302, 303, 304. By using the common data section, the CPU of an unspecified printing-medium feeding device sets information indicating the status of operation. Information indicating operating status that is output in the common data section indicates that the printing-medium feeding device is currently performing a feeding operation, by way of example. As a result, the CPU 301 of the image forming apparatus 100 according to this embodiment need not transmit the CMD signal to every printing-medium feeding device to check the status of the printing-medium feeding operation. Rather, whether any printing-medium feeding device is currently performing the feeding operation can be checked by a single STS signal; hence the communication load can be alleviated.

Switches 308, 309, 310 serving as changeover units for performing gate control in the controllers 209, 211, 213, respectively, are placed in the CMD signal line 306. The switches 308, 309, 310 change over the state of the connection of the CMD signal line 306 to each lower-order connected controller between the connected state and the disconnected state. Below a specific description will be rendered taking the switch 309 of the controller 211 as an example.

The controller 211 is connected to the higher-order controller 209 and to the lower-order controller 213. Here "higher order" indicates a position in a direction nearer the engine controller 202 placed in the image forming apparatus 100, and "lower order" indicates a position in a direction farther from the engine controller 202. The CPU 303 receives the CMD signal via the higher-order printing-medium feeding device. The CMD signal is branched by the switch 309, which operates based upon a command from the CPU 302, and is transmitted to the CPUs 303 and 304. In a case where the CMD signal is transmitted to the CPU 304 of the lower-order printing-medium feeding device, the CPU 303 places the switch 309 in the connected state. In a case where the CMD signal is not transmitted to the lower-order printing-medium feeding device, the CPU 303 places the switch 309 in the disconnected state. By thus performing gate control, the image forming apparatus 100 according to this embodiment is capable of transmitting the CMD signal to each of the optional units collectively depending upon status.

Further, the CPU 301 assigns identification information (referred to as "device ID" below) to each printing-medium feeding device in order to communicate with all of the connected printing-medium feeding devices (specifically the CPUs 302, 303, 304). The assignment of device ID is carried out by transmitting an ID specifying command (CMD signal) that specifies the device ID. A method of assigning device IDs to each of the printing-medium feeding devices will be described below. The ID assigning operation is performed at initialization when the power supply of the image forming apparatus 100 is turned on, at initialization following recovery from jamming or the like, or at the time of a reset operation based upon a command from an operation panel, not shown.

First, upon receiving an ID specifying command in a state in which the device ID has not yet been set, the CPU 302 acquires the specified device ID (e.g., device ID=1) as its own ID. To acknowledge the ID specifying command, the CPU 302 thenceforth uses the STS signal to notify the CPU 301 of the fact that device ID=1 has been finalized. The CPU 302 then places the switch 308 in the connected state.

Next, upon confirming that the connected printing-medium feeding device 111 has finalized the device ID (device ID=1), the CPU 301 transmits an ID specifying command that specifies another device ID (e.g., device ID=2). Since the CMD signal switch 308 is in the connected state at this time, the ID specifying command is transmitted to the CPUs 302 and 303.

Since the CPU 302 has already acquired its ID, it ignores the ID specifying command. Since the device ID of the CPU 303 has not yet been set, the CPU 303 acquires device ID=2 as its own ID. To acknowledge the ID specifying command, the CPU 303 thenceforth uses the STS signal to notify the CPU 301 of the fact that device ID=2 has been finalized. The CPU 302 then places the CMD signal switch 309 in the connected state. From this point onward the CPU 301 transmits ID specifying commands for different device IDs until the STS signals in response to the ID specifying commands can no longer be received from any of the printing-medium feeding devices. As a result, specific device IDs are assigned to all of the connected printing-medium feeding devices.

When specific device IDs have been assigned, the engine controller 202 designates the device IDs for all of the connected printing-medium feeding devices, thereby enabling the CMD signal to be transmitted individually. The CPUs 302, 303, 304 acknowledge the CMD signals to which the device IDs acquired by the CPUs themselves have been appended. As a result, the CPU 301 is capable of controlling all of the devices individually using common clock-synchronized serial communication lines. Further, since the CPU 301 transmits the CMD signal to all connected printing-medium feeding devices to which IDs have been assigned, the CPU 301 can transmit the CMD signal to all printing-medium feeding devices without specifying individual device IDs.

Figure 3B:
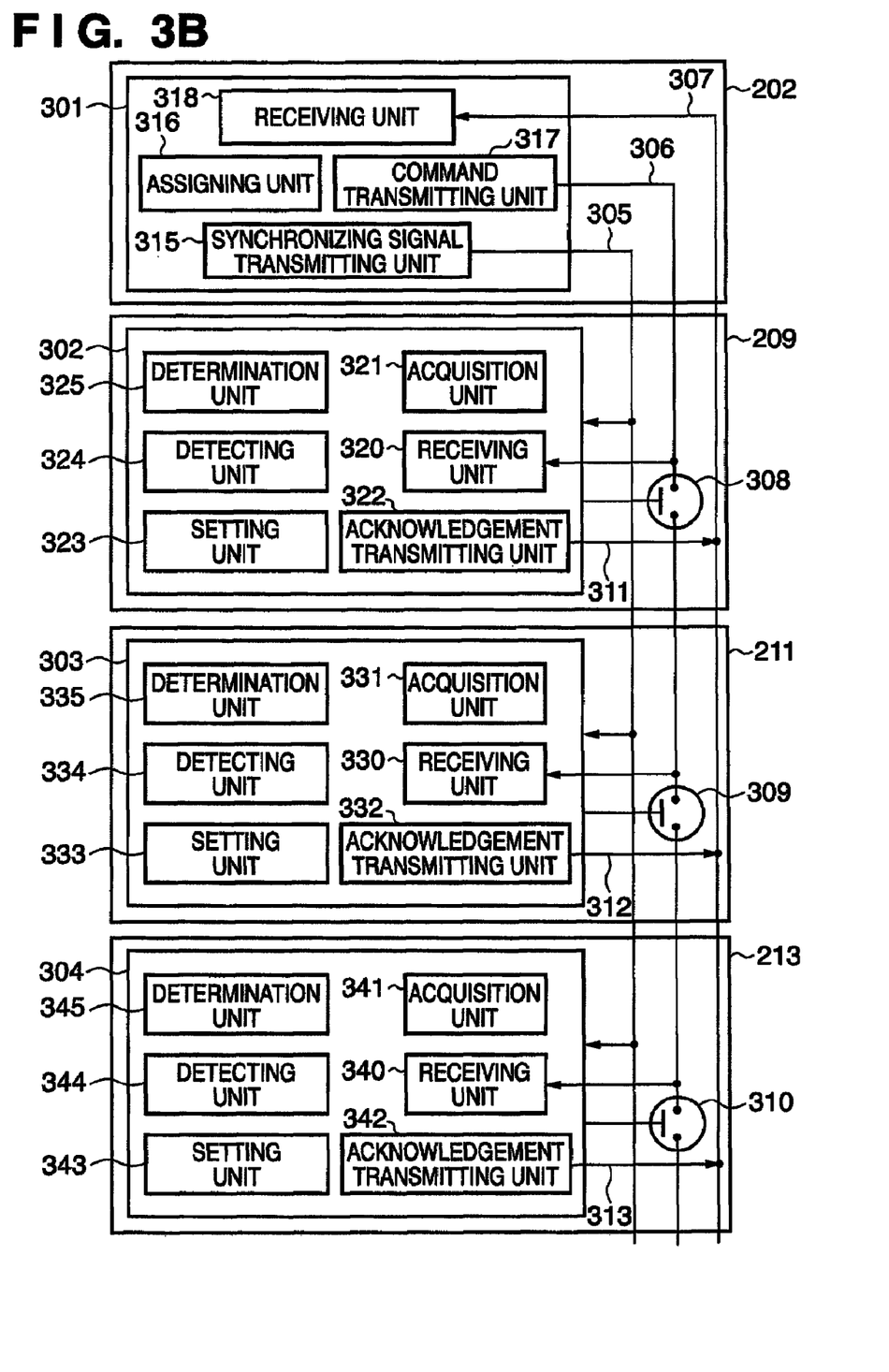
FIG. 3B is a diagram illustrating the details of control between an engine controller and a controller of each paper feeding device corresponding to the first embodiment.

FIG. 3B is a diagram illustrating the details of control between the engine controller 202 and the controllers of the printing-medium feeding devices 111, 119, 127 corresponding to the first embodiment.

The CPU 301 includes a synchronizing signal transmitting unit 315, an assigning unit 316, a command transmitting unit 317 and a receiving unit 318. The synchronizing signal transmitting unit 315 transmits the CLK signal to each printing-medium feeding device via the signal line 305. The assigning unit 316 assigns a specific identifier, which is for identifying each printing-medium feeding device, to each printing-medium feeding device. The command transmitting unit 317 outputs the CMD signal to the CMD signal line 306 and is capable of transmitting the signal to each printing-medium feeding device or to all of the printing-medium feeding devices. The receiving unit 318 receives acknowledgement status transmitted from each printing-medium feeding device in response to the CMD signal.

The CPUs 302, 303, 304 respectively include receiving units 320, 330, 340, acquisition units 321, 331, 341 and acknowledgement transmitting units 322, 332, 342. The CPUs 302, 303, 304 further respectively include setting units 323, 333, 343, detecting units 324, 334, 344 and determination units 325, 335, 345. Only the control blocks of the CPU 302 will be described below. However, similar control is carried out with regard to the CPUs 303 and 304.

The receiving unit 320 receives the CMD signal that has been output from the CPU 301. If it does not possess its own device ID, the acquisition unit 321 acquires a device ID in response to the ID specifying command, which is the CMD signal. If the identifier appended to the CMD signal is the same as the acquired identifier, the acknowledgement transmitting unit 322 outputs the STS signal conforming CMD signal to the STS signal line 307. On the other hand, if the identifier appended to the CMD signal is different from the acquired identifier, then, in accordance with the timing of the STS signal transmitted by the CPU 303 or CPU 304, the acknowledgement transmitting unit 322 outputs a value, which indicates whether this printing-medium feeding device is currently performing the feeding operation, to the STS signal line 307.

The setting unit 323 sets a value that is output in the common data section. Specifically, the setting unit 323 outputs a value as to whether the feeding operation is currently in progress. For example, the setting unit 323 outputs "0" if the feeding operation is in progress and outputs "1" if the feeding operation is not in progress. After the printing-medium feeding operation has ended, the detecting unit 324 detects whether this printing-medium feeding device contains the printing medium. In a case where absence of printing medium is detected by the detecting unit 324, the setting unit 323 outputs "1" in the common data section after the CPU 301 determines that absence of printing medium in the printing-medium feeding device 111 has been recognized. Whether or not the CPU 301 has recognized absence of the printing medium in the printing-medium feeding device 111 is determined by the determination unit 325 depending upon whether or not a predetermined period of time has elapsed. This waiting time is the time necessary for the CPU 301 to recognize the status of each printing-medium feeding device. Specifically, before the predetermined period of time elapses, the determination unit 325 determines that the CPU 301 has not sensed absence of printing medium in the printing-medium feeding device 111. Upon elapse of the predetermined period of time, on the other hand, the determination unit 325 determines that the CPU 301 has sensed absence of printing medium in the printing-medium feeding device 111. If absence of printing medium in the printing-medium feeding device 111 is determined, the determination unit 325 sends the CPU 301 information indicating absence of printing medium in response to the command from the CPU 301. It should be noted that the time during which the printing-medium feeding operation is in progress refers to the operating period from feeding of printing medium from the printing-medium feeding device to the moment at which the trailing edge of the printing medium clears the transport sensor of each printing-medium feeding device.

In a case where "0" has been set in the common data section indicating that the printing-medium feeding operation is in progress, the CPU 301 according to this embodiment decides that some printing-medium feeding device is performing the feeding operation and does not transmit a command specifying the next feed of printing medium. This suppresses the occurrence of jamming that can result by specifying feeding of printing medium anew while some printing-medium feeding device is currently performing the feeding operation. Thus, each optional unit concatenates (adds) information indicating whether another optional unit is currently performing the feeding operation to the STS signal corresponding to one CMD signal, and sends the resultant signal to the image forming apparatus 100. Accordingly, the image forming system shortens the communication time period needed to confirm that the paper-medium feeding operation is in progress and can alleviate the communication load.

Figure 4:
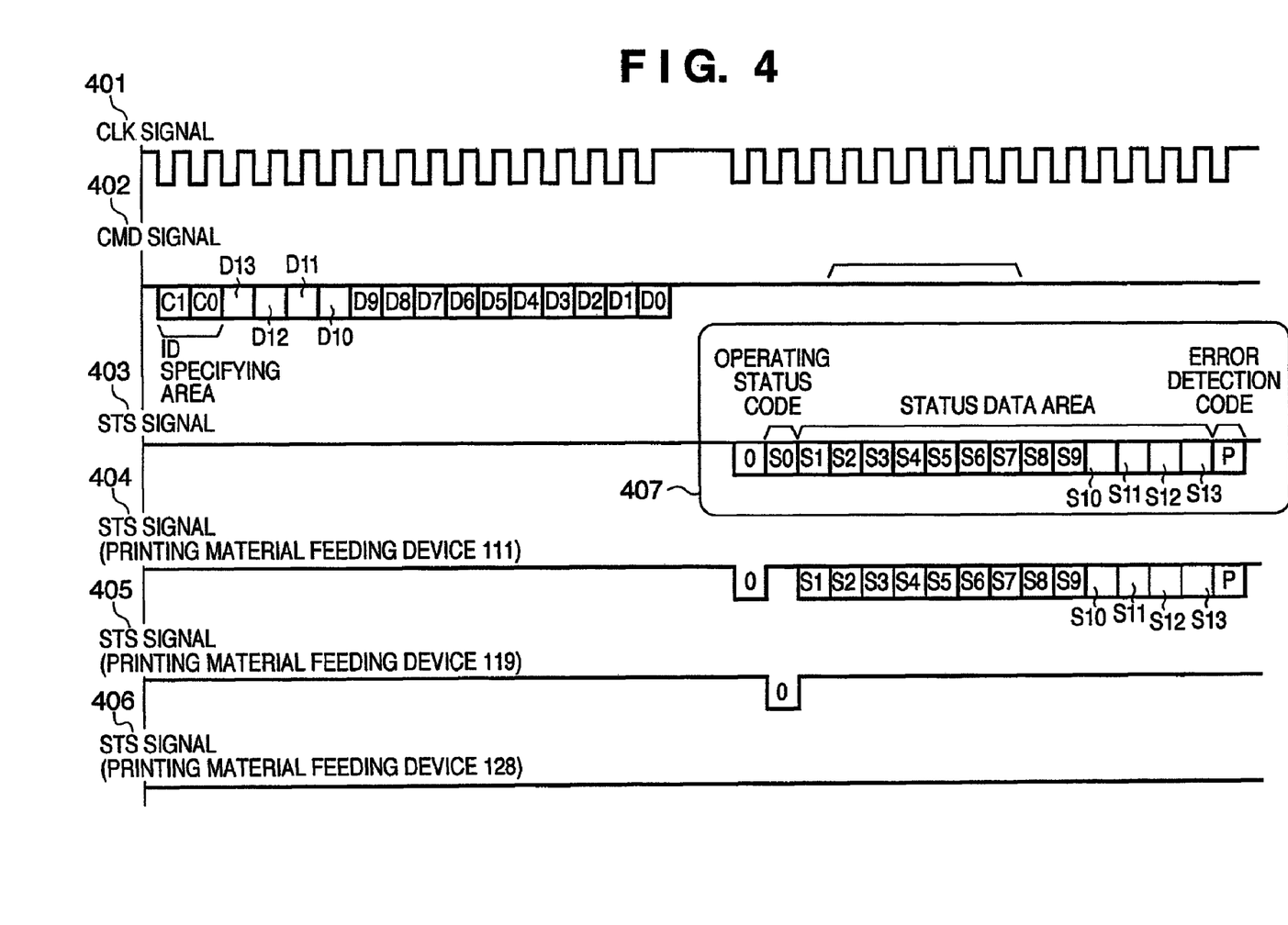
FIG. 4 is a timing chart illustrating timing of communication control signals corresponding to the first embodiment.

FIG. 4 is a timing chart illustrating timing of communication control signals corresponding to the first embodiment. Here CLK signals 401, 402 and STS signals 403, 404, 405, 406 are indicated in the order mentioned from the top of the timing chart shown in FIG. 4. The STS signals 404, 405, 406 indicate signals that have been transmitted from the printing-medium feeding devices 111, 119, 127, respectively. The STS signal 403 indicates a signal obtained by concatenating signals transmitted from each of the printing-medium feeding devices. Here it will be assumed that the device ID of printing-medium feeding device 111 has been specified and the CMD signal transmitted. In STS data 407 illustrated in FIG. 4, a feed-in-progress flag for sensing whether the printing-medium feeding operation is being performed or not is set in an area S0 by each printing-medium feeding device, and STS data indicating the status of the printing-medium feeding device 111 is set in areas S1 to S13.

The synchronizing signal transmitting unit 315 first transmits the CLK signal 401 when the command transmitting unit 317 transmits the CMD signal 402. At this time the CMD signal 402 is transmitted to the CPUs 302, 303, 304 one bit at a time in sync with the trailing edge of the CLK signal 401.

The CMD signal 402 is composed of ID specifying area C0, C1 indicating device ID, and data codes D0 to D13. Data code indicates the status of the printing-medium feeding device. For example, this is size information concerning paper contained in a paper-feed cassette of the printing-medium feeding device, information indicating whether paper is absent or present, and information as to whether a cassette has been loaded. A command is sent to the printing-medium feeding device 111 if the device ID is C0="0", C1="1", to the printing-medium feeding device 119 if the device ID is C0="1", C1="0", and to the printing-medium feeding device 128 if the device ID is C0="1", C1="1". Here the CMD signal is to the printing-medium feeding device 111 and therefore the device ID is set to C0="0", C1="1".

The STS signal in a case where the CPU 301 has transmitted the CMD signal 402 querying the printing-medium feeding device 111 about its status will be described. The STS data 407 in a case where the printing-medium feeding device 119 is currently performing the printing-medium feeding operation will be described.

The acknowledgement transmitting unit 322 outputs the STS signal 402 since the device ID acquired by this printing-medium feeding device has been specified in the received CMD signal 402. Specifically, in sync with the trailing edge of the CLK signal 401 that is output by the synchronizing signal transmitting unit 315, the acknowledgement transmitting unit 322 initially sets "0" as the first bit of data and sets the STS data successively from the third bit (area S1 shown in FIG. 4) to S13. The acknowledgement transmitting unit 322 further sets parity data of S1 to S13 in area P and outputs the resultant signal to the STS signal line 307.

The acknowledgement transmitting unit 332 outputs the STS signal 405, which indicates only information as to whether the printing-medium feeding operation is in progress, since the device ID acquired by this printing-medium feeding device has been specified in the received CMD signal 402. Specifically, in sync with the trailing edge of the CLK signal 401 that is output by the synchronizing signal transmitting unit 315 and in accordance with the timing of the STS signal 404 that is output by the acknowledgement transmitting unit 322, the acknowledgement transmitting unit 332 outputs information as to whether the printing-medium feeding operation is in progress to the STS signal line 307. Accordingly, the acknowledgement transmitting unit 332 outputs information in conformity with the timing of area S0, which is the second bit from the beginning and constitutes the common data section. Further, since the printing-medium feeding device 119 is currently performing the feeding operation, the acknowledgement transmitting unit 322 outputs "0" in the area S0. Since the device ID that has been set in the CMD signal 402 differs from the device ID of this printing-medium feeding device and the printing-medium feeding device 128 is not currently performing the feeding operation, the acknowledgement transmitting unit 342 outputs "1", which is the default value, at the timing of area S0. The fact that "1" is output means that STS data is not transmitted. In other words, since the printing-medium feeding device 128 is not currently performing the feeding operation, STS data is not set in area S0, which is the common data section.

Accordingly, the STS data 407 is data that is the result of concatenating STS signals that have been output to the STS signal line 307, which is a common signal line, from each of the printing-medium feeding devices while timing is adjusted. As a result, in a case where the CPU 301 is communicating with a specific printing-medium feeding device (here the printing-medium feeding device 111), the CPU 301 is capable of recognizing whether another printing-medium feeding device is currently performing the feeding operation. This makes it possible for the image forming apparatus 100 to perform efficient communication and makes it possible to suppress the occurrence of jamming caused by instructing a printing-medium feeding device, which is currently performing the feeding operation, to feed the printing medium redundantly.

Control during the printing-medium feeding operation will now be described with reference to FIGS. 5 to 7.

Figure 5:
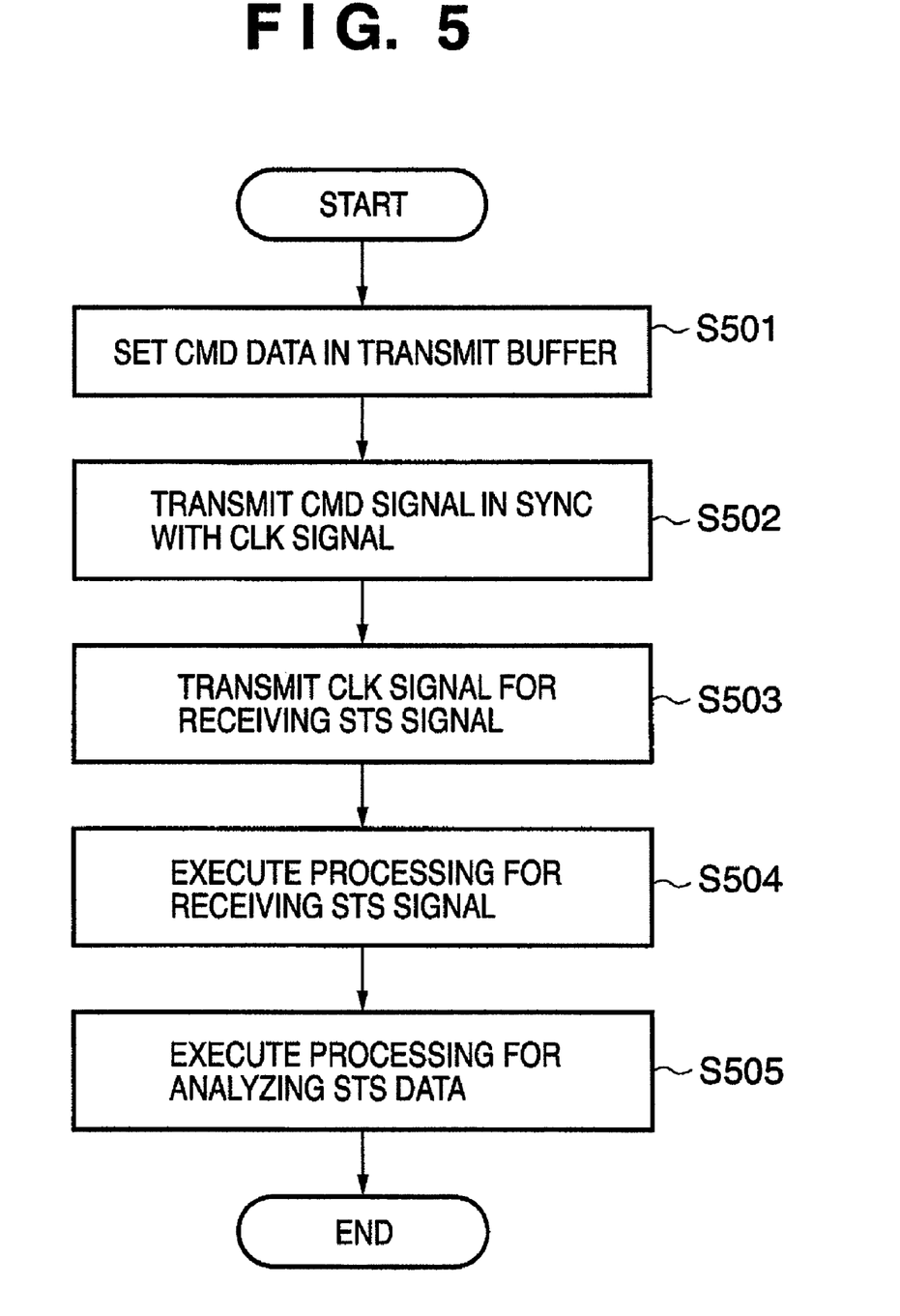
FIG. 5 is a flowchart illustrating control of an image forming apparatus corresponding to the first embodiment.

FIG. 5 is a flowchart illustrating control of an image forming apparatus corresponding to the first embodiment. Here it is assumed that the conditions described in conjunction with FIG. 4 hold, namely that the device ID that has been appended to the CMD signal 402 indicates the printing-medium feeding device 111, and that the printing-medium feeding device 119 is currently performing the feeding operation.

The CPU 301 sets CMD data in a transmit buffer at step S501. Here it is assumed that CMD data for instructing execution of printing-medium feed is set as the CMD data. Next, the command transmitting unit 317 transmits the CMD signal 402 in sync with the CLK signal 401 at step S502. If it is desired to transmit a printing-medium command to a certain specific printing-medium feeding device, the CPU 301 specifies a specific device ID. The printing-medium feeding device starts feeding the printing medium if its device ID has been set. On the other hand, if its device ID has not been set, then the printing-medium feeding device ignores the command. It should be noted that before CMD data for instructing the execution of the feeding operation is transmitted, it is confirmed that a printing-medium feeding device to which this CMD data has been transmitted is capable of performing the feeding operation.

Next, at step S503, the synchronizing signal transmitting unit 315 transmits the CLK signal 401 for receiving the STS signal 403 that is output as acknowledgement of the CMD signal 402. The receiving unit 318 then receives the STS signal 403 at step S504. The STS signal 403 is the result of concatenating the STS signal that is output from each printing-medium feeding device in the S0 area and the STS signal that is output by the acknowledgement transmitting unit 322 in another area.

Finally, at step S505, the CPU 301 analyzes the signal of the STS data received. Here the CPU 301 checks the status of each printing-medium feeding device and checks to determine whether there is a printing-medium feeding device that is currently performing the feeding operation. If a printing-medium feeding device currently performing the feeding operation exists, then, until the status indicative of the fact that the feeding operation is in progress vanishes, the CPU 301 does not transmit the CMD signal 402 instructive of feed of the printing-medium feeding device to any of the printing-medium feeding devices inclusive of the printing-medium feeding device currently performing the feeding operation.

Figure 6:
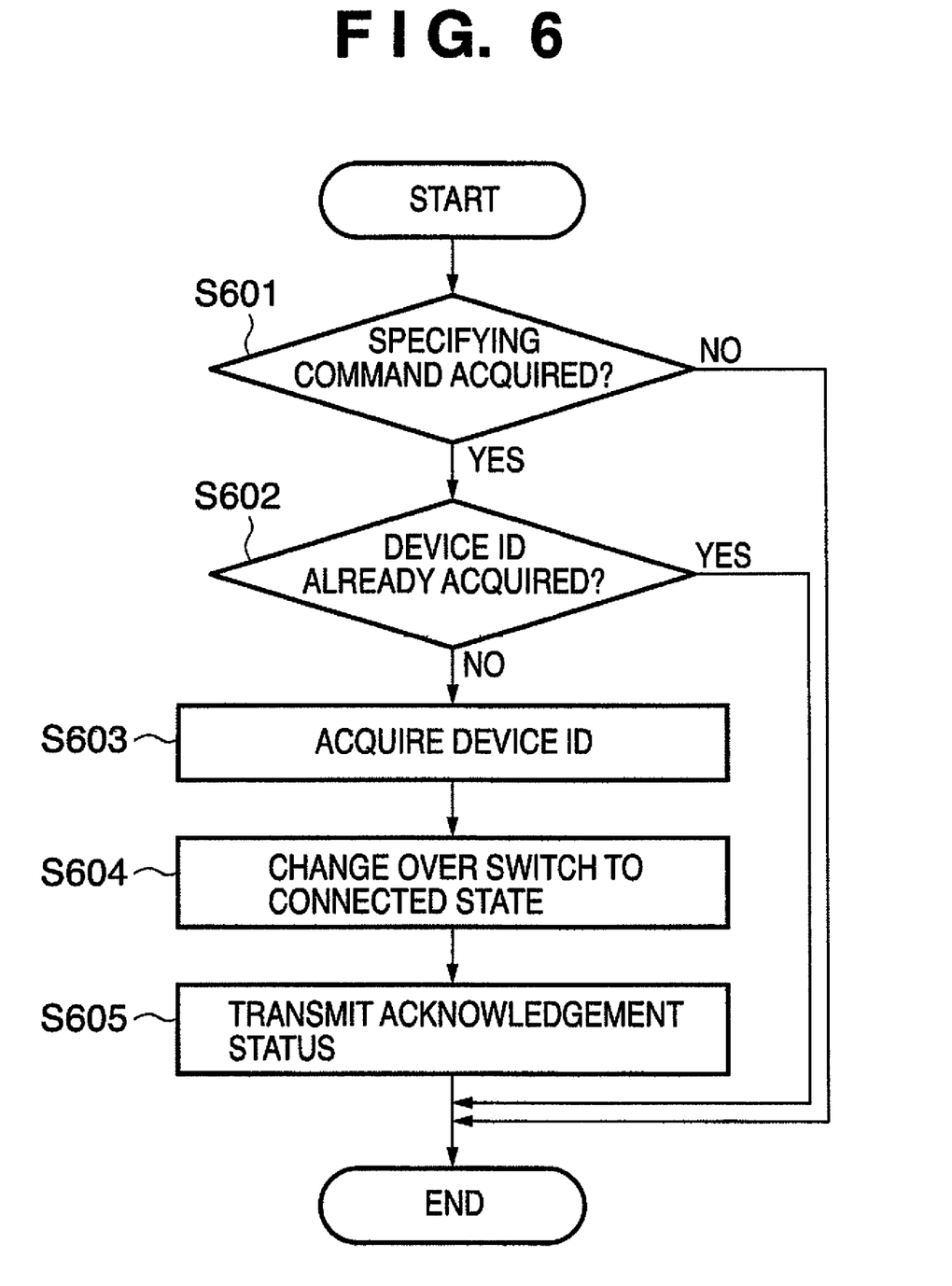
FIG. 6 is a flowchart illustrating control of a paper feeding device corresponding to the first embodiment.

FIG. 6 is a flowchart illustrating control of a paper feeding device corresponding to the first embodiment. Described here will be control of each printing-medium feeding device in a case where a command specifying a device ID has been transmitted from the CPU 301 as the CMD signal. The specifying command usually is transmitted by the CPU 301 when the image forming apparatus 100 is started up or restarted. Processing executed by the CPU 302 of the printing-medium feeding device 111 will be described as one example.

The CPU 302 determines at step S601 whether the received CMD signal is the specifying command. Specifically, the CPU 302 determines whether the value of ID specifying area C0C1 shown in FIG. 4 is a value indicative of the specifying command. If the CMD signal is the specifying command, then the CPU 302 advances processing to step S602. If the CMD signal is not the specifying command, then the CPU 302 terminates processing.

At step S602, the CPU 302 determines whether this printing-medium feeding device has already acquired a device ID, which is the specific identifier. The CPU 302 terminates processing if a device ID has already been acquired and advances processing to step S603 if a device ID has not been acquired. At step S603, the acquisition unit 321 acquires the device ID, which has been set in the CMD signal, as its own device ID.

If the device ID is acquired, the CPU 302 changes over the switch 308 to the connected state at step S604. That is, the switch 308 will have been set to the disconnected state under a condition in which a device ID has not been assigned to this printing-medium feeding device. If the switch 308 is changed over to the connected state, then the CMD signal from the next cycle will be sent to the CPUs 302 and 303.

Finally, at step S605, the acknowledgement transmitting unit 322 outputs the STS signal that notifies the CPU 301 of the fact that this printing-medium feeding device has acquired the device ID specified by the specifying command. When the CPU 301 receives the STS signal in response to the specifying command, the next specifying command is output by the command transmitting unit 317. This is repeated until the STS signal is no longer received. When the STS signal is no longer received, the image forming system attains a state in which device IDs are assigned to all printing-medium feeding devices and the CMD signal is transmitted to all printing-medium feeding devices.

Figure 7:
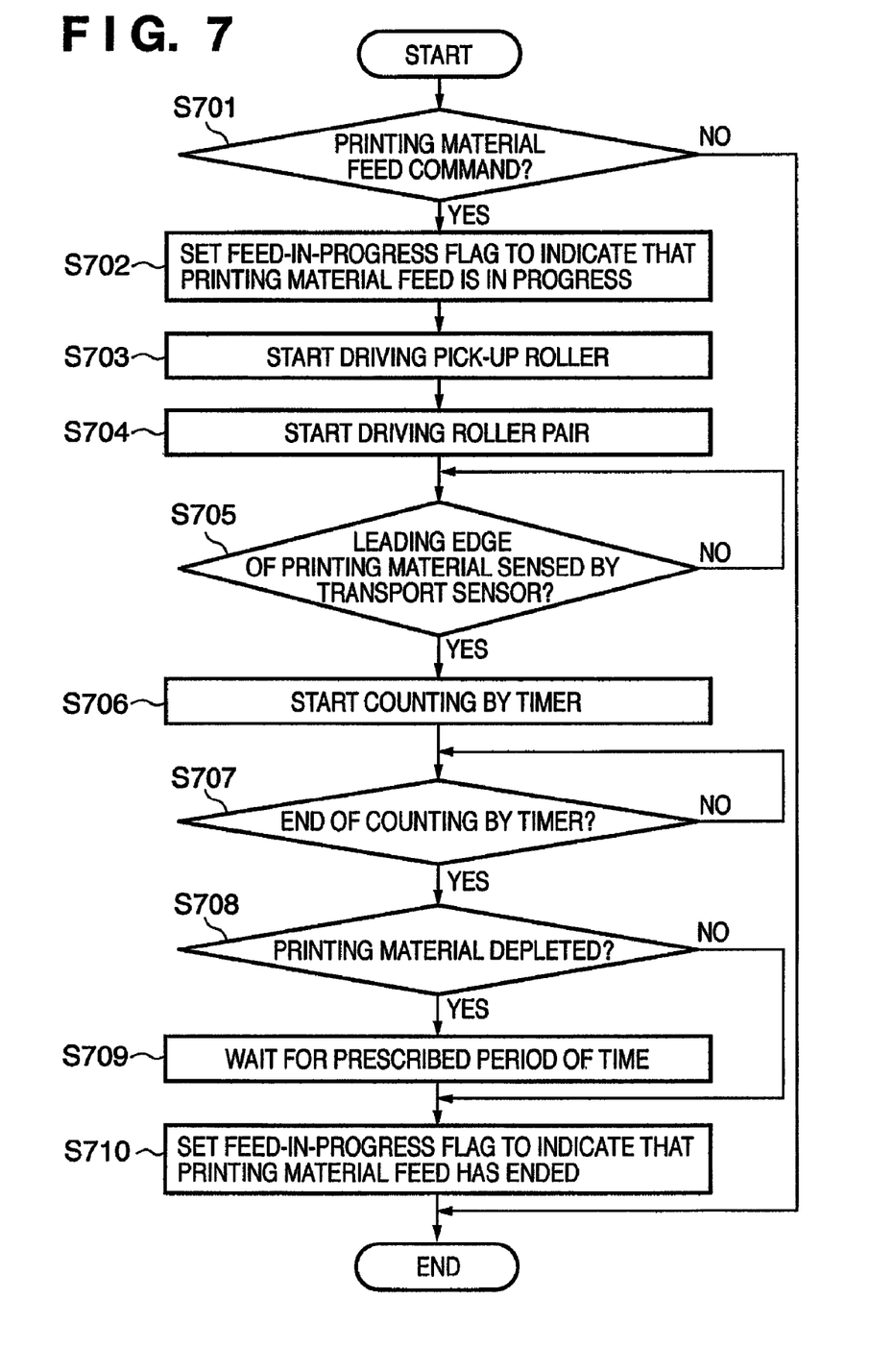
FIG. 7 is a flowchart illustrating control of a paper feeding device corresponding to the first embodiment.

FIG. 7 is a flowchart illustrating control of a paper feeding device corresponding to the first embodiment. Specifically, the timing at which the CPUs 302, 303, 304 set the feed-in-progress flag of the STS data from true (S0="0") to false (S0="1") will be described. It is assumed that the printing-medium feeding device 119 receives the printing-medium feed command and then starts feeding the printing medium under conditions similar to the conditions assumed in FIG. 4.

At step S701, the CPU 303 determines whether the CMD signal 402 transmitted from the CPU 301 is the feed command. The CPU 303 starts the feed of the printing medium in a case where the CMD signal 402 is the feed command and this printing-medium feeding device is not currently performing the feeding operation. On the other hand, if the CMD signal 402 is not the feed command, then the CPU 303 terminates processing. When feeding of the printing medium starts, then, at step S702, the feed-in-progress flag held within the CPU 303 is set by the CPU 303 to indicate that feed of the printing-medium feeding device is in progress. If the feed-in-progress flag has been set to indicate that feed of the printing-medium feeding device is in progress, the setting unit 333 always sets "0" (printing-medium feeding operation is in progress) in the area S0 when the STS signal 405 is transmitted.

The CPU 303 causes the pick-up roller 124 to make one revolution at step S703, thereby causing the printing medium 140 to be fed from the printing-medium cassette 120. Next, at step S704, the CPU 303 starts driving the roller pair 125 for feeding the printing medium 140, which has been picked up by the pick-up roller 124, to the transport path 103 one sheet at a time.

Next, at step S705, the CPU 303 uses the transport sensor 126 to determine whether the leading edge of the fed printing medium 140 has been sensed. If the leading edge of the printing medium 140 has not been sensed, the CPU 303 repeatedly executes the determination step S705 periodically until the leading edge of the printing medium 140 is sensed. If the leading edge of the printing medium 140 is sensed, then the CPU 303 causes a timer counter to start counting at step S706.

At step S707, the CPU 303 determines whether the value of the count started at step S706 is indicative of an elapsed time that has been predetermined for every size of printing medium 140. That is, the CPU 303 measures the time it takes for the printing medium 140 to pass by the transport sensor 126. This period of time is the time for controlling the intervals of the printing-medium feeding operation is performed and is set so as to suppress the occurrence of jamming without reducing the throughput of the image forming operation.

If it is determined at step S707 that the predetermined time has elapsed, then the detecting unit 334 detects at step S708 whether the printing medium 140 has been loaded in the printing-medium cassette 120. The detecting unit 334 checks the status of the printing-medium-loaded sensor 123 in order to sense whether the printing medium 140 is present or not. If the printing medium 140 is present, then, at step S710, the setting unit 333 sets "1" in the area S0 of the STS data in such a manner that the feed-in-progress flag will indicate the end of the printing-medium feeding operation. It should be noted that the CPU 303 judges that the feeding operation has ended if the trailing edge of the printing medium is sensed by the transport sensor 126. Accordingly, using the receiving unit 318, the CPU 301 detects that the area S0 of the STS data has changed from "0" to "1". As a result, the CPU 301 instructs the printing-medium feeding device to perform the succeeding printing-medium feeding operation. As a specific example of operation by the CPU 301, the command transmitting unit 317 sends all of the printing-medium feeding devices (except for any that is currently performing the feeding operation) the CMD signal, which is for inquiring about the states of each of these devices, at intervals of 10 ms. Further, in accordance with this embodiment, if any printing-medium feeding device is currently performing the feeding operation, "0" is always set in the area S0 of the STS data serving as the response to the CMD signal. However, by virtue of the processing of step S710, "1" is set in the area S0 in such a manner that the feed-in-progress flag will indicate the end of the feeding operation. Thus, the CPU 301 senses that the printing-medium feeding operation has ended by the change from "0" to "1" of the area S0 of the periodically received STS data.

On the other hand, if it is determined that the printing medium 140 is absent, then the CPU 303 waits at step S709 for passage of a predetermined period of time. This waiting time is the time it takes for the CPU 301 to recognize the status of each printing-medium feeding device. For example, the CPU 301 recognizes a plurality of types of states of each of the printing-medium feeding devices by receiving a plurality of STS signals sent back in response to transmission of a plurality of the CMD signals. That is, a state indicating whether the printing medium 140 is present in a cassette is only one item of information among states of multiple types. Accordingly, it is required that the CPU 301 transmit the CMD signal for the status check to each of the printing-medium feeding devices over a plurality of times. If the printing medium 140 in a specific printing-medium feeding device is depleted in such case, the CPU 301 transmits the CMD signal a plurality of times and acquires information indicating that the printing medium 140 has been depleted in the specific printing-medium feeding device.

Thus, the timing at which depletion of the printing medium 140 loaded in the specific printing-medium feeding device is detected differs between the printing-medium feeding device, which is an optional unit, and the image forming apparatus proper. For example, if the CPU 303 executes the processing of step S710 with this shift in timing as is, i.e., immediately upon determining that there is no printing medium 140, then the CPU 301 will instruct that the next printing-medium feeding operation be performed. This raises the possibility that the feed command will be issued to the printing-medium feeding device in which the printing medium 140 has been depleted and therefore raises the possibility that a no-printing-medium error will arise. At step S709, therefore, the CPU 303 executes the standby processing for the prescribed length of time in order to cancel out the offset in timing. The CPU 301 then executes the processing of step S710. As a result, upon recognizing that the printing medium 140 has been depleted, the CPU 301 is capable of transmitting the next feed command to a printing-medium feeding device in which the printing medium has been loaded. It should be noted that the prescribed period of time mentioned here includes at least the time for transmitting the CMD signal for determining whether the printing medium has been depleted in each printing-medium feeding device serving as an optional unit, and the time for transmitting the STS signal from each printing-medium feeding device in response to the CMD signal. The prescribed period of time is set taking into consideration the maximum communication delay times of the CMD and STS signals.

Further, in this embodiment, whether the printing medium exists in a cassette is determined after the printing-medium feeding operation is performed. This is carried out in order to suppress wear of the roller pairs caused by idling, as well as the occurrence of jamming, by monitoring depletion of the printing medium 140 loaded in the cassette.

Thus, as described above, the present image forming system includes an image forming apparatus and one or more optional units removably connected to the image forming apparatus by a plurality of common serial lines capable of serial communication. The image forming apparatus assigns an identifier to each optional unit, transmits a specifying command and an instruction command to the common signal lines and receives acknowledgement status by the common signal lines. Each optional unit receives the specifying command and the instruction command and acquires its own identifier in accordance with the specifying command. Furthermore, each optional unit outputs acknowledgement status to the common signal lines in a case where the received instruction command is an instruction command directed to this optional unit. Further, in a case where the received instruction command is not an instruction command directed to the optional unit, the optional unit outputs information, which indicates whether or not this optional unit is currently operating, in accordance with the timing of acknowledgement status that is output by another optional unit. As a result, the present image forming system is capable of checking the operating states of all connected optional units at one time based upon the acknowledgement status that corresponds to the instruction command. Accordingly, the present image forming system is capable of alleviating the load of communication for checking operation without increasing the number of signal lines between the image forming apparatus and the optional units.

Further, the invention is particularly effective in a configuration in which a plurality of printing-medium feeding devices are connected as optional units, as described above. In this case it may be so arranged that each printing-medium feeding device outputs information as to whether or not the feeding operation is in progress as the common data section in the acknowledgement status that is in response to the instruction command. Furthermore, in a case where the information in the common data section does not indicate that the feeding operation is in progress, the image forming apparatus transmits the next printing-medium feed command. Accordingly, the present image forming system is capable of alleviating the load of communication for checking the printing-medium feeding operation without increasing the number of signal lines between the image forming apparatus and the printing-medium feeding devices.

Further, each printing-medium feeding device may be so adapted as to detect whether or not it has been loaded with the printing medium after it has fed the printing medium. Furthermore, the printing-medium feeding device may be so adapted that in a case where there is no recording medium, the device sets a value in the common data section indicating that the printing-medium feed operation has ended, this being performed after the image forming apparatus detects that there is no printing medium in the printing-medium feeding device. As a result, the present image forming apparatus reduces instances in which a printing-medium feeding device whose printing medium has been depleted by the printing-medium feeding operation is instructed to perform a succeeding feeding operation. Accordingly, the present image forming apparatus is capable of reducing unnecessary communication and of lightening the communication load.

Second Embodiment

Next, a second embodiment of the present invention will be described with reference to FIG. 8. The second embodiment is characterized in that the waiting time of each printing-medium feeding device is varied until the image forming apparatus senses that printing medium loaded in the printing-medium feeding device has been depleted. In the first embodiment, the maximum communication delay time is estimated and set according to the timing for setting the value at which the feed-in-progress flag indicates end of the printing-medium feeding operation. In this embodiment, the CPU 301 uses the CMD signal to instruct each printing-medium feeding device in such a manner that this time period can be varied in accordance with the number of connected printing-medium feeding devices.

Figure 8:
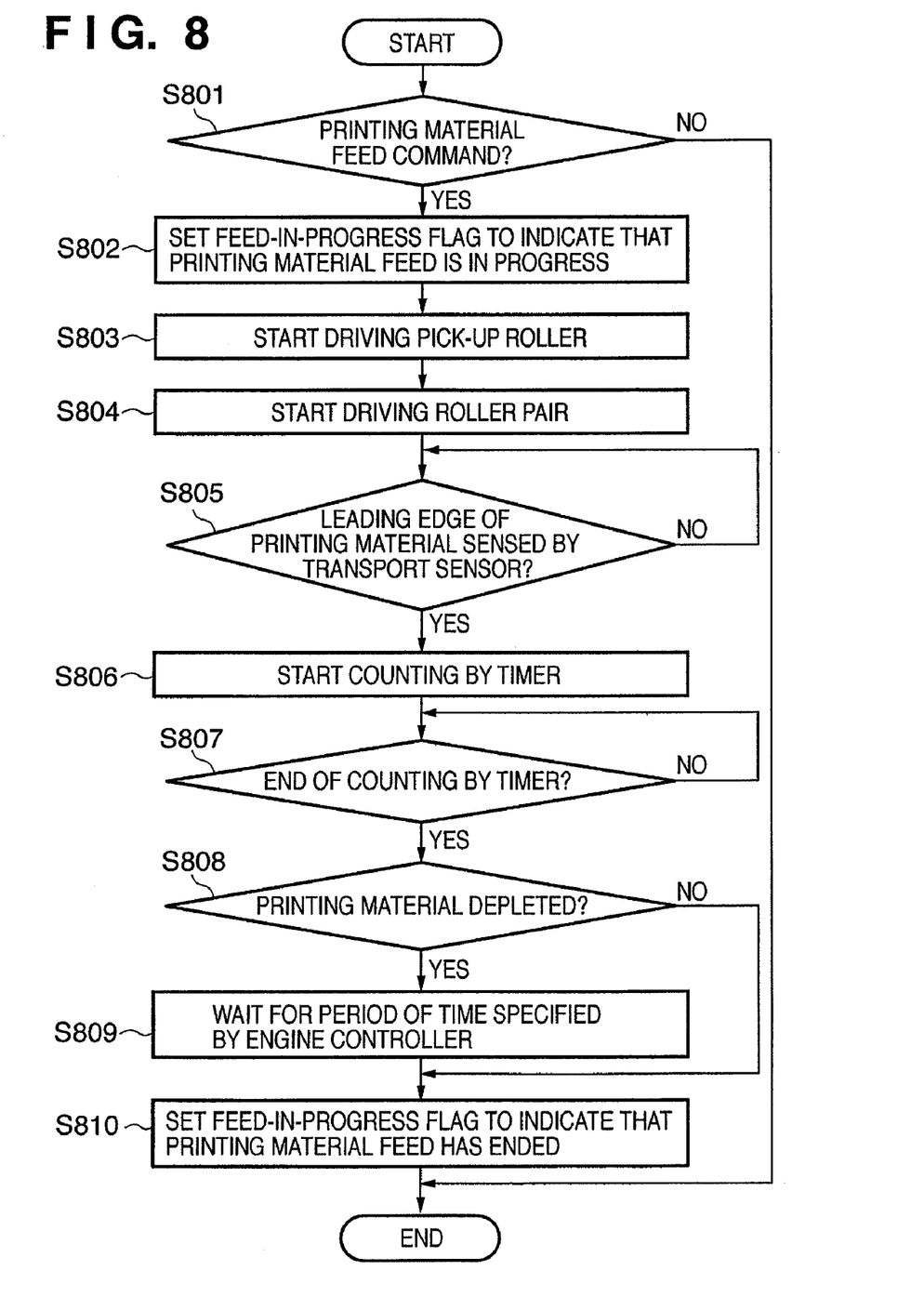
FIG. 8 is a flowchart illustrating control of a paper feeding device corresponding to a second embodiment of the present invention.

FIG. 8 is a flowchart illustrating control of a paper feeding device corresponding to the second embodiment. In this embodiment, control of the image forming apparatus is similar to that indicated in the flowchart of FIG. 5. With regard to the CMD signal, however, the above-described specification of waiting time is performed. It should be noted that processing similar to that described in conjunction with FIG. 7 is not described again. That is, only the processing of step S809 will be described below.

At step S809, the CPU 303 causes processing to wait until a time specified by the CPU 301 elapses. When the specified period of time elapses, at step S810 the CPU 303 sets the value at which the feed-in-progress flag indicates end of the printing-medium feeding operation. Here the period of time specified by the CPU 301 differs depending upon the printing-medium feeding device. The time it takes for the image forming apparatus to sense the no-printing-medium information at each printing-medium feeding device is set as this period of time. Accordingly, the optimum period of time is set for each printing-medium feeding device.

At each printing-medium feeding device, therefore, the present image forming system improves throughput at the time of continuous printing and makes it possible to reliably sense the last sheet of printing medium just prior to depletion of the printing medium. Further, the present image forming apparatus is such that after the depletion of printing medium, it is possible to shorten the time needed to change over to another printing-medium feeding device containing the same size printing medium and resume the printing-medium feeding operation. Accordingly, the present image forming apparatus reading shortens communication time period and alleviates communication load without increasing the number of signal lines between the image forming apparatus and optional units.

The present invention is capable of providing an image forming system in which an increase in the number of signal lines between an image forming apparatus and optional unit is suppressed, communication time period shortened and communication load alleviated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-236758, filed Aug. 31, 2006, which is hereby incorporated by reference herein in its entirety.

What is claimed is:

1. An image forming system comprising:
an image forming apparatus adapted to form an image on a printing medium;
a plurality of printing-medium feeding devices removably attached to said image forming apparatus;
a common first signal line connecting said image forming apparatus and each of said plurality of printing-medium feeding devices, said first signal line being adapted to transmit a command from said image forming apparatus to each of said plurality of printing-medium feeding devices; and
a common second signal line connecting said image forming apparatus and each of said plurality of printing-medium feeding devices, said second signal line being adapted to transmit status information of said printing-medium feeding devices from said plurality of printing-medium feeding devices to said image forming apparatus in response to the command, wherein
said image forming apparatus has a transmitting unit adapted to specify one of said plurality of printing-medium feeding devices and transmit the command via said first signal line,
the specified printing-medium feeding device has a transmitting unit adapted to transmit first information via said second signal line in response to the command transmitted by said transmitting unit of said image forming apparatus, and
an unspecified printing-medium feeding device has a control unit adapted to concatenate second information with the first information.

2. The system according to claim 1, further comprising
a common third signal line connecting said image forming apparatus and each of said plurality of printing-medium feeding devices, said third signal line being adapted to transmit a clock signal from said image forming apparatus to said plurality of printing-medium feeding devices;
wherein transmission of the command and reception of the status information are executed in sync with the clock signal.

3. The system according to claim 1, wherein the first information is information relating to status of each printing-medium feeding device, and the second information is information indicating whether each printing-medium feeding device is currently performing a printing-medium feeding operation.

4. The system according to claim 3, wherein said image forming apparatus receives the information and decides whether a succeeding printing-medium feed command will be transmitted or not based upon information indicating whether the printing-medium feeding operation is currently being performed.

5. A printing-medium feeding device connected to an image forming apparatus, said device comprising:
a receiving unit adapted to receive a command that is output from the image forming apparatus;
a transmitting unit adapted to transmit first information to the image forming apparatus in response to the command;
a first signal line adapted to receive the command from the image forming apparatus;
a second signal line adapted to transmit the first information to the image forming apparatus; and
a third signal line adapted to synchronize communication with the image forming apparatus,
wherein, in a case where another printing-medium feeding device connected to the image forming apparatus transmits the first information to the image forming apparatus, said transmitting unit concatenates second information different from the first information to the first information transmitted by the other printing-medium feeding device.

6. A printing-medium feeding device connected to an image forming apparatus, said device comprising:
a receiving unit adapted to receive a command that is output from the image forming apparatus; and a transmitting unit adapted to transmit first information to the image forming apparatus in response to the command, wherein, in a case where another printing-medium feeding device connected to the image forming apparatus transmits the first information to the image forming apparatus, said transmitting unit concatenates second information different from the first information to the first information transmitted by the other printing-medium feeding device, andwherein the first information is information relating to an acknowledgment status of the printing-medium feeding device, and the second information is information as to whether the printing-medium feeding device is currently performing a printing-medium feeding operation.

7. An image forming system comprising:

an image forming apparatus adapted to form an image on a printing medium; and a plurality of printing-medium feeding devices removably attached to said image forming apparatus, wherein said image forming apparatus comprises a controller for sending a request to one of said printing-medium feeding devices, and wherein one of said printing-medium feeding devices transmits, as first information, a status of the printing-medium feeding device in response to a request from said controller to the printing-medium feeding device, and as second information that is different from the first information, a status associated with printing-medium feeding in response to a request from said controller to another printing-medium feeding device.

8. The system according to claim 7, wherein, when information from the other printing-medium feeding device is received, the printing-medium feeding device combines the first information and the information from the other printing-medium feeding device or the second information and the information from the other printing-medium feeding device, and transmits the combined information.

9. A printing-medium feeding device connected to an image forming apparatus, said device comprising:

a receiving unit adapted to receive a command that is output from the image forming apparatus; and a transmitting unit adapted to transmit information to the image forming apparatus in response to the command, wherein said transmitting unit transmits, as first information, a status of the printing-medium feeding device in response to a request to the printing-medium feeding device in the command, and as second information that is different from the first information, a status associated with printing-medium feeding in response to a request to another printing-medium feeding device in the command.

10. The printing-medium feeding device according to claim 9, wherein when information from the other printing-medium feeding device is received, the transmitting unit combines the first information and the information from the other printing-medium feeding device or the second information and the information from the other printing-medium feeding device, and transmits the combined information.

11. An image forming system comprising:

an image forming apparatus adapted to form an image on a printing medium;

a plurality of printing-medium feeding devices removably attached to said image forming apparatus;

a common first signal line connecting said image forming apparatus and each of said plurality of printing-medium feeding devices, said first signal line being adapted to transmit a command from said image forming apparatus to each of said plurality of printing-medium feeding devices; and a common second signal line connecting said image forming apparatus and each of said plurality of printing-medium feeding devices, said second signal line being adapted to transmit status information of said printing-medium feeding devices from said plurality of printing-medium feeding devices to said image forming apparatus in response to the command, wherein said image forming apparatus has a transmitting unit adapted to specify one of said plurality of printing-medium feeding devices and transmit the command via said first signal line, the specified printing-medium feeding device has a transmitting unit adapted to transmit the status information of said specified printing-medium feeding device via said second signal line in response to the command transmitted by said transmitting unit of said image forming apparatus, and an unspecified printing-medium feeding device has a control unit adapted to concatenate, with the status information of said specified printing-medium feeding device, information indicating whether said unspecified printing-medium feeding device is currently performing a printing-medium feeding operation.

* * * * *